United States Patent [19]

Kiyokawa

[11] Patent Number: 4,803,949
[45] Date of Patent: Feb. 14, 1989

[54] FISH CULTURING METHOD AND SAC-FRY POND FOR USE IN PRACTICING SAME

[75] Inventor: Shin Kiyokawa, Sohka, Japan
[73] Assignee: Misato Plaheat Mfg. Ltd., Saitama, Japan
[21] Appl. No.: 72,183
[22] Filed: Jul. 10, 1987
[30] Foreign Application Priority Data
  Jul. 17, 1986 [JP] Japan .................. 61-166575
  Mar. 3, 1987 [JP] Japan .................. 62-46679
[51] Int. Cl.⁴ .................................. A01K 61/00
[52] U.S. Cl. .................................. 119/3
[58] Field of Search .................. 119/3, 4, 5

[56] References Cited

U.S. PATENT DOCUMENTS 3,716,025 2/1973 Lawson ..................... 119/3
3,765,372 10/1973 Moe, Jr. et al. .......... 119/3
4,379,437 4/1983 Knowles .................. 119/3
4,625,728 12/1986 Schonberg ............... 119/1 X

FOREIGN PATENT DOCUMENTS 127936 10/1980 Japan ...................... 119/3

Primary Examiner—Robert P. Swiatek
Attorney, Agent, or Firm—Armstrong, Nikaido, Marmelstein & Kubovcik

[57] ABSTRACT

A fish culturing method and a sac-fry pond for practicing the method are disclosed, which utilize irradiation of far infrared rays from above the water surface in a culturing pond and/or from the bottom of the pond to promote growth of fry in water of a relatively low temperature, substantially without raising the temperature of water which is consumed in a great amount.

8 Claims, 2 Drawing Sheets

FISH CULTURING METHOD AND SAC-FRY POND FOR USE IN PRACTICING SAME

BACKGROUND OF THE INVENTION

This invention relates to a fish culturing method and a sac-fry pond for use in practicing the method and more particularly, to a fish culturing method capable of rearing lively sac-fry from an eyed or hatching stage to a release or adult stage and controlling a sac-fry growth rate, and also to a sac-fry pond provided with a fish culturing means.

As the rearing of fry has been popularized so as to secure the fishery resources, problems have arisen as known well, which include a difficulty in securing water of a suitable temperature. In a district having a river to which for example salmons and trouts are expected to return, an artificial propagation of fish and fish culturing activities have been extensively carried out. As the districts in which the artificial propagation of fish and the rearing of fry are done increase, it becomes difficult to secure water of a preferable quality which has an optimum fry-rearing temperature (approximately 8° C). The temperature of spring water in Hokkaido, Japan, is approximately 8° C. but a sufficient quantity of such spring water can be obtained in limited districts only. Since it is difficult to obtain a required quantity of such spring water, water from some other sources of water supply, for example, river water and river-bed water have come to be used today.

Salmons and trouts spawn in autumn, and juveniles obtained from the spawn are released in the following year, so that it is necessary to collect water in a cold season. The artificial propagation of salmons and trouts is carried out extensively in Hokkaido and Tohoku districts in Japan. In some areas of these districts in which spring water cannot easily be obtained, river-bed water is generally used. The temperature of the river-bed water in these districts in the fish culturing season, i.e., in a period of time of from autumn to spring in the following year is as low as 1° to 4° C. Consequently, rearing of fry is hindered in these fish culturing places.

The steps of growth of salmons and trouts from the collection of spawns to the swimming-up of fry are expressed on the basis of the daily cumulative water temperature obtained by multiplying the number of fry-rearing days counted from the day of fertilization by an average water temperature (° C.) of the same days. According to this system of expressing the standard steps of growth of salmons and trouts based on the daily cumulative water temperature, substantially 450° to 710° C. corresponds to the step from the fertilization to hatching, and substantially 960° to 1100° C. to the step from the fertilization to swimming-up. Feeding is started when the fry begin to swim up, and such fry are reared in a sac-fry pond of a larger depth until the fry have grown up to such an extent that they can be released.

Therefore, if salmons and trouts are reared at a suitable water temperature of 8° C. and a lower water temperature of, for example, 4° C. throughout the fish culturing period from the collection of spawns to the swim-up of fry, the fry-rearing period counted from the day of collection of spawns in the former case is substantially 125 days (1000÷8), while the fry-rearing period counted from the day of collection of spawns in the latter case is 250 days, i.e., a very large number of days are required. The results of researches show that, at a water temperature other than a suitable water temperature, the fry grow more slowly than at a suitable water temperature. Moreover, the estimated return rate of the juveniles reared at a suitable water temperature and released is about 3%, whereas the estimated return rate of the juveniles reared at a lower temperature and released is not more than 1.5% which is far lower than the above percentage.

In order to eliminate these inconveniences, it becomes necessary that the fish culturing water be heated so as to maintain the temperature of the water at a suitable level. Since it is necessary that the fry of salmon be reared in flowing water, a great deal of quantity of heat is required. This causes a great increase in the cost of maintaining the temperature of the water in use at a suitable level. Another problem resides in that heating the water collected from a river causes a decrease in the content of the dissolved oxygen, and the derangement of the ecosystem of the microorganisms in the collected water. Therefore, heating such water is not preferable.

Rearing fry at a low water temperature has another problem. Namely, rearing fry at a low water temperature causes not only a delay in the growth of the fry but also an increase in the death rate of the fry and a decrease in the yield of the fish. The fry have a habit of swimming against a flow of water seeking for more agreeable environment, and, accordingly, they gather at a position in the vicinity of a water feed port of a water tank. In the natural environment, salmons and trouts grow as they stay still at the same positions from the stage of hatching to that of swim-up. Therefore, it is not preferable in view of fry-rearing management that the fry gather at one position, and rearing fry as they are left gathering at one position has great influence upon the fish-culturing results. Consequently, it is important to develop fry-rearing techniques for making environment in which the fry grow as they stay still at the same positions from the stage of hatching to that of swim-up.

SUMMARY OF THE INVENTION

The present invention has been developed with a view of improving the fish culturing method and sac-fry pond with respect to these points. An object of the present invention is to provide a fish culturing method capable of making preferable environment by using fish culturing water of a temperature lower than a suitable level and less energy, so as to rear lively fry, and controlling the rate of growth of fry; and a sac-fry pond provided with equipment for practicing this method.

The above object has been achieved by applying far infrared rays to substantially the whole surface of a fry-rearing portion of a sac-fry pond.

The application of far infrared rays to a sac-fry pond according to the present invention causes the fry to be heated without substantially increasing the temperature, which is lower than a suitable level, of water in use, and thereby promotes the growth of the fry.

The term "fry" used herein includes sac-fry in the stage of growth of fry which is between the time at which eyes appear clearly on fish bodies created in the spawns or the time at which the spawns are hatched and the time at which feeding is started, and fry in the stage of growth of fry which is between the time at which feeding is started and the time at which the fry have grown into juveniles and released into a river or the time at which the fry have grown into adults.

The term "sac-fry pond" used herein includes a sac-fry pond suitably used to rear fry in the stage of growth thereof which is between the time at which eyes appear on the fish bodies in the spawns or the time at which the spawns are hatched and the time at which feeding is started, and a sac-fry pond used to rear the fry in the stage of growth thereof which is between the time at which feeding is started and the time at which the fry are released into a river or the time at which the fry have grown into adults.

DESCRIPTION OF THE PREFERRED EMBODIMENTS

Figure 1:
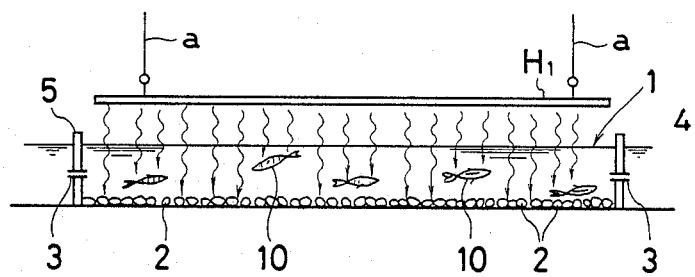
FIG. 1 is a schematic illustration of Example 1.

First, a far infrared ray radiator means included in the heating means used in the present invention will now be described.

Generally, far infrared rays mean infrared rays having a wavelength of 6 to 1000μ, and the far infrared rays used in the present invention are also the far infrared rays of a wavelength in such range. The far infrared rays do not exclude other thermic rays and visible rays, nor do they inhibit themselves from being accompanied by other thermic rays and visible rays which are radiated simultaneously with the radiation of the far infrared rays. However, as generally known, irradiation of young fish from hatchlings to fry which have just swam up with visible rays should be avoided.

According to the present invention, the far infrared rays are applied directly to fish bodies, which are located in a distant place, irrespective of the positional relation between a far infrared ray radiator and fry to give excellent vital effect to the fry, and thereby heat the fry while displaying a fry-growing effect of the far infrared rays, whereby the fry can be grown in a preferable manner even in water of a low temperature. A preferable far infrared ray radiator means consists of means for radiating far infrared rays from the surface of water, and means for radiating such rays from the bottom of a sac-fry pond, i.e. a bed surface radiator means.

The far infrared ray radiator (which will hereinafter be referred to as a far infrared heater) used in the present invention is not specially limited. A far infrared heater of a wavelength of about 5 to 50 μmm, and preferably about 15 to 50 μmm is usually used. It is necessary that, especially the fry of salmon and trout, which are in a stage of growth in which eyes appear on the spawns or a stage of growth in which the spawns are hatched, up to a stage of growth in which the fry swim up, be reared in the dark. In such a case, means for radiating far infrared rays at a low temperature is preferably used. In order to radiate far infrared rays from a position above a sac-fry pond, it is preferable that the far infrared heater be fixed at a position suitably distant from the surface of the water for ease of handling.

In order to generate far infrared rays at a low temperature, an electric current is applied to, for example, a layer of carbon particles to generate Joule heat at a low temperature of, for example, not more than 100° C., and the Joule heat is radiated from a radiating surface which is preferably roughened with ceramic particles, such as silica sand. Thus, far infrared rays containing no visible rays can be radiated.

An example of the far infrared heater provided above the upper surface of a sac-fry pond is formed as follows. A gypsum plaster board is coated on one surface thereof with a layer obtained by dispersing carbon particles into a binder of a synthetic resin, and electrode wires are arranged at both end portions of the resultant product to form a heating layer. A layer obtained by dispersing ceramic particles into a binder of a synthetic resin is formed on a heating layer or the other surface of the gypsum plaster board, or black paint is applied to the same surface, to form a radiating layer, the other or rear surface of the heating layer being covered with an insulating material. A modified example of this far infrared heater is formed by substituting the gypsum plaster board by a metal sheet. Since metal-sheet far infrared heaters are capable of radiating far infrared rays containing no visible rays, they can be used suitably for heating fry in a sac-fry pond. The far infrared heater is used with the temperature of the radiating layer usually maintained at, for example, substantially not more than 100° C, i.e. substantially at 20° to 80° C.

A waterproof heating unit the temperature of which is regulated to a high level may be placed on the bottom of a sac-fry pond as an example of a far infrared heater capable of radiating far infrared rays containing no visible rays. A more easily practiceable heating means can be obtained by finishing the bottom portion of a sac-fry pond with mortar and heating the surface of the mortar to a low temperature. In order to heat this mortar layer, a suitable heat source, such as an electric heat source, a hot water supply source or some other heating medium is used. If this mortar layer is formed to a thickness of 4 to 5 cm, the cracking-preventing strength of the bottom portion of the sac-fry pond and variations in temperature of the heating unit can be maintained uniformly. This arrangement enables far infrared rays to be radiated stably from the bottom of the sac-fry pond into the water therein through a comparatively simple temperature control operation.

The intensity of the far infrared rays used when the present invention is practiced is not specifically limited, and it must be changed depending upon the conditions of use of the far infrared heater. This intensity is determined experimentally in a suitable manner before practicing the invention.

The far infrared radiator used in the present invention and capable of radiating far infrared rays containing no visible rays is set so that the far infrared rays are radiated uniformly to substantially all the fry rearing regions in the sac-fry pond. Each of these heating means can be used effectively, especially, for rearing fry (sac-fry) from the stage of growth in which spawns are hatched to the stage of growth in which the fry swim up.

According to the present invention, any conventional sac-fry pond can be used. Namely, a sac-fry pond used in the present invention may be such that it is suitable for controlling fry from the stage of growth in which eyes appear on the spawns or the spawns are hatched to the stage of growth in which the fry swim up, capable of maintaining the depth of the water as necessary at a level suitable for rearing fry up to a later stage of growth in which the fry are released, provided with a water feed and discharge arrangements which enable uniform and calm water currents to be generated in all parts of the interior of the sac-fry pond, and can be kept clean easily. Especially, in a sac-fry pond used to rear fry until they have swum up, it is usually necessary to lay pebbles, among which the fry are to hide, on the bottom surface thereof for the purpose of making the interior of the pond similar to the natural environment. The pebbles may be replaced by rings of a suitable length obtained by cutting a plastic pipe crosswise into pieces or some other suitable modified products.

The outline of a sac-fry pond for use in rearing salmons and trouts will further be described. With regard to the rearing of sac-fry, a water tank is prepared, which is constructed so that the depth of water can be maintained at a suitable level of several to ten centimeters. Pebbles are laid on the flat bottom surface to a layer of around 3 to 4 cm, and a weir is provided to carry out the feeding and discharging of water effectively and thereby enable a uniform distribution of water currents to be obtained. This water tank is shut off from the direct sunlight and kept dark, and it is protected carefully against any excessively large vibrations. A suitable number of fry, for example, not more than 15,000 fry per 1 $m^3$ shall be held in the water tank. Consideration shall be given the population density of fry in the water tank so as to prevent fry from being held therein excessively.

In a sac-fry pond in which the fry in the stage of growth in which the fry have already swum up and in the later stages are reared, the depth of water is set to not less than 40 cm so as to prevent the excoriation of the fry, and the new inflow water exchange rate to not less than 1. The water in the pond is controlled so that the exchanging of the water in the whole of the interior of the pond is done uniformly. In a sac-fry pond in which the depth of the water is 40 cm, the population density of fry is set to for example 10 kg/$m^2$, and water is fed at not more than 1 l/min per 1 kg of fry, the feeding conditions being controlled suitably.

The kind of fish reared in the sac-fry pond according to the present invention is not specifically limited. Accordingly, this sac-fry pond can be used for rearing various kinds of young fishes and shellfishes, such as flatfish, young yellowtail, sea bream, eel, scallop, ear shell, sea urchin and shrimp in addition to salmon and trout referred to above.

EXAMPLE 1

The present invention will now be described concretely with reference to the accompanying drawings and on the basis of an Example, in which the present invention is applied to the rearing of fry (sac-fry) of salmon from the stage of growth in which the spawns are hatched to the stage of growth in which the fry swim up.

FIG. 1 is a schematic diagram illustrating the fry rearing condition in this Example. In FIG. 1, a sac-fry pond 1 is a water tank of about 0.5 m in width and about 2 m in length in which pebbles 2, the diameter of each of which is around 3.5 cm, are laid with the depth of the water maintained at about 5 cm. At both lengthwise end portions of the water tank 1, a water feed weir 4 and a water discharge weir 5 are arranged, and each of the weirs 4 and 5 has pipes 3 of about 2 cm in diameter made of hard vinyl chloride, spaced at intervals of 10 cm and opened below the water level.

A far infrared heater $H_1$ is suspended with strings a so that it is positioned above the sac-fry pond 1 (usually distant from the water level by up to about 40 cm). The far infrared heater is formed detachably in a manner such that the distance between the heater and the water level can be regulated freely so as to irradiate the surface of the water uniformly with far infrared rays and expose as necessary the upper surface of the sac-fry pond 1 to the open air. The distance referred to above between the far infrared heater and the surface of water was set to be adjustable in the range of 10 to 200 cm.

Figure 2:
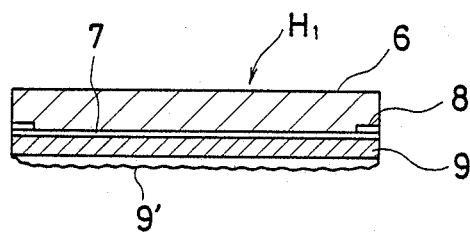
FIG. 2 is a sectional view of a far infrared ray radiator used in the Example of FIG. 1.

The far infrared heater $H_1$ was formed as follows. As shown in the sectional view of FIG. 2, a heating layer 7 consisting of carbon particles and a binder of a synthetic resin into which the carbon particles are dispersed was provided on a surface of a flexible board 6, and metal electrode wires 8 were arranged in the vicinity of both of the longer edges of the resultant product. A far infrared ray radiating layer 9 consisting of ceramic particles and the same binder of a synthetic resin as mentioned into which the ceramic particles were dispersed was formed on the surface of the heating layer 7. The temperature of the heating layer 7 and that of the radiating layer 9 were maintained at about 50° C. and about 40° C., respectively. This far infrared heater 2 consists of a heating unit capable of radiating heat containing a high percentage of far infrared rays and no visible rays. Reference numeral 9' denotes a pockmarked layer consisting of a ceramic material and a binder of a synthetic resin into which the ceramic material is dispersed.

River-bed water was fed into the sac-fry pond 1 under regular management conditions, and about 10,000 fry (sac-fry) of salmon having a daily cumulative water temperature of 480° C. were placed in the water. The sac-fry were managed under such conditions which were required by an ordinary salmon-rearing management, until the sac-fry swam up. The average temperature of the river-bed water during this time was 4.8° C.

This sac-fry rearing control operation was carried out as the distance between the far infrared heater $H_1$ and the surface of the water was regulated in accordance with the growing condition of the fry and the temperature of the water. In a sac-fry pond in which far infrared rays were not radiated, it took 110 days to rear the fry up to the stage of growth in which the fry swam up, while, in this Example, this number of days could be reduced to 80, and the fry could be reared to lively juveniles.

The condition of growth of the fry during this time was found by observing the fry frequently. During this fry-rearing period, the temperature, which was maintained at a certain level by the radiation of far infrared rays from the far infrared heater 2 and measured with a regular thermometer, did not vary. Thus, according to this Example, the consumption of energy was reduced to a far lower level than in the conventional method in which the water itself in the sac-fry pond was heated when the temperature thereof was low, and, moreover, the fry were reared to lively juveniles.

EXAMPLE 2

Figure 3:
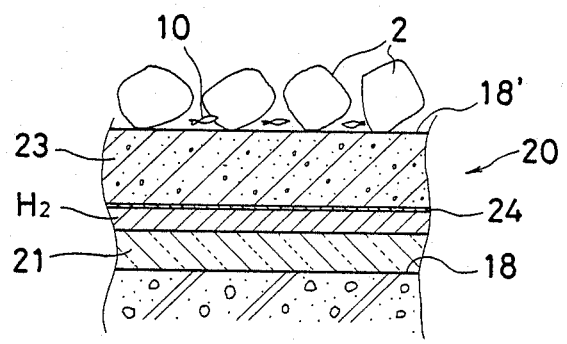
FIG. 3 is a sectional view of a principal portion of a sac-fry pond in Example 2 of the present invention.
Figure 4:
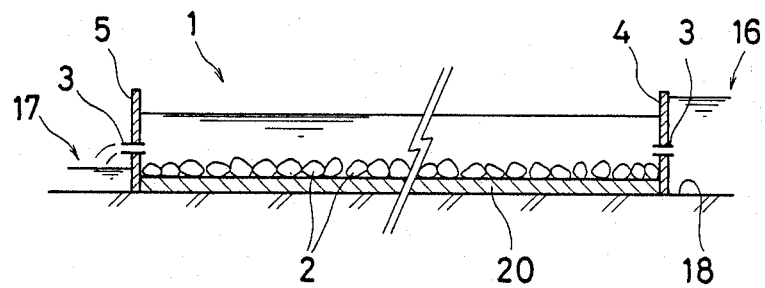
FIG. 4 is a schematic view in longitudinal section of the sac-fry pond as a whole which is shown in FIG. 3.

FIG. 3 is a sectional view of principal portions of a sac-fry pond used in Example 2, and FIG. 4 a longitudinal section illustrating the construction of the sac-fry pond as a whole of FIG. 3.

Referring to FIG. 4, a sac-fry pond 1 consists of a rectangular water tank of about 1.8 m in width and about 50 m in length, in which pebbles 2 the diameter of each of which is around 3.5 cm are laid, which water tank has a flat bottom surface and is capable of regulating the depth of water therein in the range of up to substantially 50 cm. The portion of the interior of the water tank which extends about 12 m in the lengthwise direction thereof was partitioned off so as to form a test section by arranging a water feed weir 4 and a water discharge weir 5 each of which had pipes 3 of about 2 cm in diameter made of hard vinyl chloride, spaced at regular intervals of 10 cm and opened below the surface of the water, whereby the test section was formed in parallel with the remaining parts of the water tank to provide a water feed passage 16 and a water discharge passage 17 on the front and rear sides of the water tank.

A heating member 20 was provided on substantially the whole surface of the bottom 18 of the divisional water tank in this Example. As shown on an enlarged scale in FIG. 3, the heating member 20 was formed by laying a sheet of an insulating material 21 of 25 mm in thickness on the bottom 18, an electric heater $H_2$ (commercially obtainable under the trademark, Plaheat) thereon which will be described later, and a mortar layer 23 and an agricultural polyethylene sheet 24 for waterproofing the heater $H_2$ on the same heater $H_2$. The mortar layer 23 was formed to a thickness of about 4 cm to use the upper surface thereof as a bottom surface 18' of the sac-fry pond 1 in this Example. The thermal capacity of this mortar layer 23 serves to eliminate temperature variations. The thickness of the mortar layer was set to 4 cm not only for increasing the thermal capacity thereof but also for preventing the occurrence of cracks, i.e., for obtaining other technical effects. The sac-fry 10 were seen to settle calmly behind pebbles 2.

Figure 5:
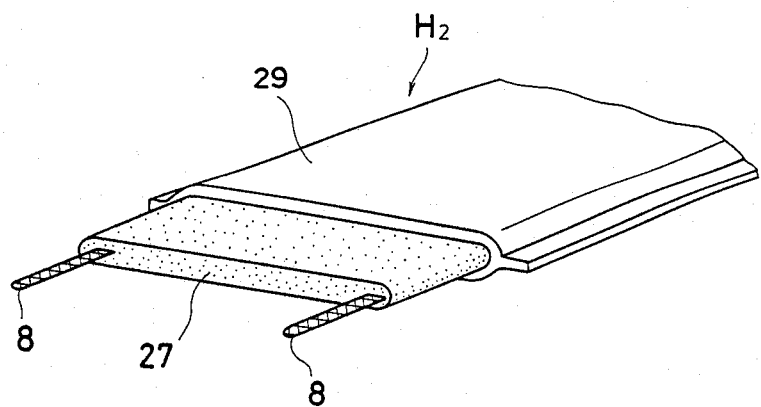
FIG. 5 is a partially cutaway perspective view, taken for illustration of the construction of a heating unit used in the Example of FIG. 3.

The heating unit in this Example will now be described in detail with reference to FIG. 5. As shown in FIG. 5, the Plaheat $H_2$ is formed by burying electrode wires 8, each of which consists of copper wires plainly-woven like a ribbon, in both end portions of a sheet type conductive layer 27 consisting of a carbon particle-mixed thermoplastic resin, to obtain a heating body, and covering the surface of this heating body with an insulating layer 29 consisting of an electrically insulating flexible resin. The Plaheat $H_2$ was obtained by cutting into pieces of a suitable length an extrusion-molded elongated product of such construction having a width of 23 cm.

Temperature variation of the Plaheat $H_2$ was controlled to within +1° C. by a temperature controller using a thermistor.

10,000 eyed spawns were placed in a sieve type net, and the resultant net was set in a position, which was about 1 cm below the water level, in the sac-fry pond 1 in each of the above Examples and a Comparative Example. The fry which broke out of the spawns swam by themselves through the net and hid in the pebble layer. River water of a temperature of 1° to 2° C. was supplied as the fry-rearing water into each sac-fry pond during the test period so that the flow rate of 35 l/min was attained. When spring water of a suitable temperature of 8° C. was used, the standard flow rate was 80 l/min. The number of days required by the fry to thus absorb their yolk sacs and swim up in each sac-fry pond was shown in the below Table.

EXAMPLE 3 AND COMPARATIVE EXAMPLE

Two sac-fry ponds having the same shape as the sac-fry pond in Example 2 were set in parallel with the sac-fry pond in Example 2. A heating unit having the same specification as the heating unit used in Example 1 was suspended about 40 cm above the surface of the water in one of the two sac-fry ponds, and a fry-rearing operation was carried out with the temperature of the surface of the heating unit maintained at 30° C. throughout the fry-rearing period (Example 3). In the other sac-fry pond, the fry were reared in the same manner as in Examples 2 and 3 except that heating equipment was not provided at all for the comparison's sake (Comparative Example). While tests were conducted in Examples 2 and 3 and the Comparative Example, the average atmospheric temperature was −12° C., the temperature of the water 1° to 2° C., and the dry bulb temperature and black bulb temperature of the surface of the water in the test section in Example 3 were 0° to 1° C. and 8° C., respectively. The results of Example 3 and the Comparative Example are shown together with those of the Example 2 in the following table.

TABLE

|  | Temperature of heater (°C.) | Number of days counted from the day of hatching of spawns to that of swimming-up of fry | Average temperature of water (°C.) |
| --- | --- | --- | --- |
| Example 2 | 12–15 | 50 | 1–2 |
| Example 3 | 30 | 52 | " |
| Comparative Example | — | 120 | 1–2 |
| (Reference) | — | 30 | 8 |

In general, when sac-fry of salmon which took 30 days from the day of fertilization to that of hatching were reared in spring water (refer to "Reference" in the above table) of a suitable temperature, they swum up normally in 60 days in total (at a daily cumulative water temperature of 480° C.) after the day of fertilization thereof. According to the results shown in the above Table, the total numbers of days of the period in which the fry in Example 2 and the fry in Example 3, in which far infrared rays were radiated into the sac-fry pond, were reared from the day of fertilization to that of swimming-up are 80 days and 82 days, respectively, which mean that the fry in these Examples grew at substantially the same rate. The results in the above Table show that the fry could be reared to the stage of growth, in which the fry swam up, in only about 20 days later than in the case where spring water of a suitable temperature is used, whereas the fry in these Examples were reared under bad conditions, i.e., by using river water the temperature of which was 6° to 7° C. lower than a suitable level.

On the other hand, 150 days were required in the Comparative Example, so that it is understood that the fry cannot be grown sufficiently before the season of release thereof. If the fry is reared by directly heating the water in the sac-fry pond, the required quantity of heat is ten times larger than that in the above Examples using suspended heating means, and the quality of the water deteriorates due to the heat, the growth of the fry being thereby adversely affected.

The results, which deserve special mention, of a comparison between Examples 2 and 3 and the Comparative Example will now be described. In Examples 2 and 3, the movement of the fry was not observed until they swam up. The number of fry moved was smaller in Example 2 than in Example 3. The movements of many fry toward the upstream side of the sac-fry pond was observed in Comparative Example. Since such movements of fry are usually observed even in spring water of a suitable temperature, it can be said that the results of Example 2 are unique. It is considered that the cause of this phenomenon resides in the following: The temperature of the bottom of the sac-fry pond is higher than that of the water, and the radiant heat (which occurs theoretically due to the far infrared rays) is applied to the fry to warm them, so that the temperature of the fry rises. Accordingly, the fry hide among the pebbles and stay fixedly at same positions. Consequently, the fry do not move against the flow of water, i.e., they do not act by instinct. Therefore, if spring water of a suitable temperature is used in the sac-fry pond in the present invention, the pond can apply advantageously to the rearing of fry.

According to Examples 1 to 3 described above, the consumption of energy can be reduced to a far lower level (not more than 1/10) than in the case where water is heated when the temperature thereof is low, and, moreover, the fry can be reared to lively juveniles.

As described above, the fry pond according to the present invention is constructed so that substantially the whole surface of the bottom of the pond, which is used with the water flowing therein, serves as a radiating floor surface, by providing a heating unit. Therefore, if this sac-fry pond is used to rear fry from the stage of growth in which eyes appear on the spawns or the stage of growth in which spawns are hatched up to the stage of growth in which the fry swim up or released or become adults, the growth of the fry is promoted even when water of a temperature which is not higher than a suitable level is used. Moreover, the habit of the fry of moving toward the upstream side of a flow of water seeking suitable environment can be suppressed to thereby enable the fry to stay at same positions in the water of a low temperature.

I claim:

1. A fish culturing method comprising a step of applying, from an artificial source, heat rays containing far infrared rays but substantially no visible rays over substantially the whole surface of a fish culturing pond in which sac-fry are reared, from one side of said pond, while shutting off said pond from substantially all other light sources 2. A fish culturing method according to claim 1, wherein said far infrared rays are radiated from a position above the surface of the water in said sac-fry pond.

3. A fish culturing method according to claim 1, wherein said far infrared rays are radiated from the bottom surface of said sac-fry pond.

4. A fish culturing method according to claim 1, wherein said far infrared rays are radiated from a position above the surface of the water in said sac-fry pond and the bottom surface of said pond.

5. A sac-fry pond comprising means for applying, from an artificial source, heat rays containing far infrared rays but substantially no visible rays over substantially the whole area of the sac-fry pond and for shutting off said pond from substantially all other light sources, said means being provided on one side of said pond.

6. A sac-fry pond according to claim 5, wherein said means is provided above the surface of the water in said pond.

7. A sac-fry pond according to claim 5, wherein said means is provided on the bottom surface of said pond.

8. A sac-fry pond according to claim 5, wherein said means is provided in a position above the surface of the water in said pond and also on the bottom surface of said pond.

* * * * *